(12) United States Patent
Shen et al.

(10) Patent No.: US 12,525,838 B2
(45) Date of Patent: Jan. 13, 2026

(54) STATOR OF DYNAMO-ELECTRIC MACHINE

(71) Applicant: Hitachi Astemo Electric Motor Systems, Ltd., Hitachinaka (JP)

(72) Inventors: Junjie Shen, Hitachinaka (JP); Shingo Ito, Hitachinaka (JP); Yuuki Umetsu, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 229 days.

(21) Appl. No.: 18/210,714

(22) Filed: Jun. 16, 2023

(65) Prior Publication Data
US 2023/0421011 A1 Dec. 28, 2023

(30) Foreign Application Priority Data
Jun. 28, 2022 (JP) .................... 2022-103835

(51) Int. Cl.
*H02K 3/50* (2006.01)
*H02K 3/52* (2006.01)

(52) U.S. Cl.
CPC .................. *H02K 3/50* (2013.01); *H02K 3/52* (2013.01)

(58) Field of Classification Search
CPC ............ H02K 5/225; H02K 3/38; H02K 3/50; H02K 3/52; H02K 3/28; Y02T 10/64
USPC .......................................... 310/71
See application file for complete search history.

(56) References Cited

U.S. PATENT DOCUMENTS

| 2005/0275296 | A1* | 12/2005 | Kumakura | H02K 3/505 310/71 |
| 2006/0163959 | A1* | 7/2006 | Ogawa | H02K 3/38 310/201 |
| 2016/0006314 | A1* | 1/2016 | Kaneshige | H02K 3/48 310/71 |
| 2021/0013761 | A1* | 1/2021 | Mashiko | H02K 5/225 |

FOREIGN PATENT DOCUMENTS

| JP | 2006-211810 A | 8/2006 |
| WO | WO-2022258544 A1 * | 12/2022 ............... H02K 5/10 |

* cited by examiner

*Primary Examiner* — Alexander A Singh
(74) *Attorney, Agent, or Firm* — Crowell & Moring LLP (57) ABSTRACT

Provided is a stator of a dynamo-electric machine capable of sufficiently securing the strength of a welding portion of a winding and a coil of a power distribution member by a required minimum configuration, without affecting the insulation coating thickness of an entire end portion. The stator of the dynamo-electric machine of the present invention includes a stator core, a winding wound around the stator core, a power distribution member having a coil in which one end is connected to the winding and the other end is connected to a power supply device, and an insulating film coating at least one end portion of the winding. The stator has a fixing portion fixing the winding and the coil of the power distribution member.

6 Claims, 6 Drawing Sheets

STATOR OF DYNAMO-ELECTRIC MACHINE

CLAIM OF PRIORITY

The present application claims priority from Japanese Patent application serial no. 2022-103835, filed on Jun. 28, 2022, the content of which is hereby incorporated by reference into this application.

BACKGROUND OF THE INVENTION

The present invention relates to a stator of a dynamo-electric machine.

BACKGROUND

A stator of a dynamo-electric machine has windings wound around a stator core, and a large number of electric wires, such as coils, for transmitting power supplied from a power supply device to the windings. These electric wires are typically fixed at portions thereof by insulating resins or the like in order to be prevented from being broken by the vibration of a motor.

Japanese Unexamined Patent Application Publication No. 2006-211810 discloses a segment joining type dynamo-electric machine in which a head portion coil end 6A, a draw-out wire for lead wire (that is, a portion projected to the head portion coil end 6A side of a start end segment) 9, a draw-out lead wire 10, and a neutral point (that is, a portion projected to the head portion coil end 6A side of a terminal end segment) 16 are insulation coated by insulating resins 14 that are powder processed. For example, epoxy resin particles are coated, are heated, and are melted, so that they are insulation coated and are integrated. Likewise, also in an end portion side coil end, they are insulation coated by the insulating resins, and are mutually integrated. Thus, it is possible to solve a problem of, for example, the breakage of a welding portion due to the vibration of the draw-out lead wire 10 with respect to vibration or the like, and the like.

SUMMARY OF THE INVENTION

However, in the fixing method described in Japanese Unexamined Patent Application Publication No. 2006-211810, the entire end portion including the head portion coil end 6A, the draw-out wire for lead wire 9, and the neutral point 16 other than the portions described above is insulation coated, and consequently, when the power distribution member and the end portion side coil end are attempted to be fixed, the coating film thickness of the entire end portion becomes large, with the result that there are problems of the increased product weight and cost and the lowered heat dissipation properties of the end portion.

In addition, when the coating film thickness of the entire end portion is attempted to be reduced, there is a problem that it is difficult to control and predict which part of the power distribution member is fixed to the end portion side coil end and whether the part can be strongly fixed.

In view of the above circumstances, an object of the present invention is to provide a stator of a dynamo-electric machine capable of sufficiently securing the strength of a welding portion of a winding and a coil of a power distribution member by a required minimum configuration without affecting the insulation coating thickness of an entire end portion.

An aspect of the present invention for solving the above problems provides a stator of a dynamo-electric machine including a stator core, a winding wound around the stator core, a power distribution member having a coil in which one end is connected to the winding and the other end is connected to a power supply device, and an insulating film coating at least one end portion of the winding. The stator has a fixing portion fixing the winding and the coil of the power distribution member.

A more specific configuration of the present invention is described in the scope of claims.

According to the present invention, it is possible to provide the stator of the dynamo-electric machine capable of sufficiently securing the strength of the welding portion of the winding and the coil of the power distribution member by the required minimum configuration without affecting the insulation coating thickness of the entire end portion.

Objects, configurations, and effects other than the above will be apparent from the description of the following embodiments.

DETAILED DESCRIPTION OF THE PREFERRED EMBODIMENTS

Hereinafter, examples of the present invention will be described in detail. An example of a dynamo-electric machine for high voltage vehicle having a sequential segment joining type stator coil of the examples will be described below on the basis of the respective embodiments illustrated in the drawings. The dimensions, shapes, materials, and the like described below are illustrative for description, and can be changed according to the specifications of the stator of the dynamo-electric machine. In the following, the same elements are indicated by the same reference numerals in all the drawings, and the overlapped description thereof is omitted.

First Example

[The Configuration of the Stator]

Figure 1:
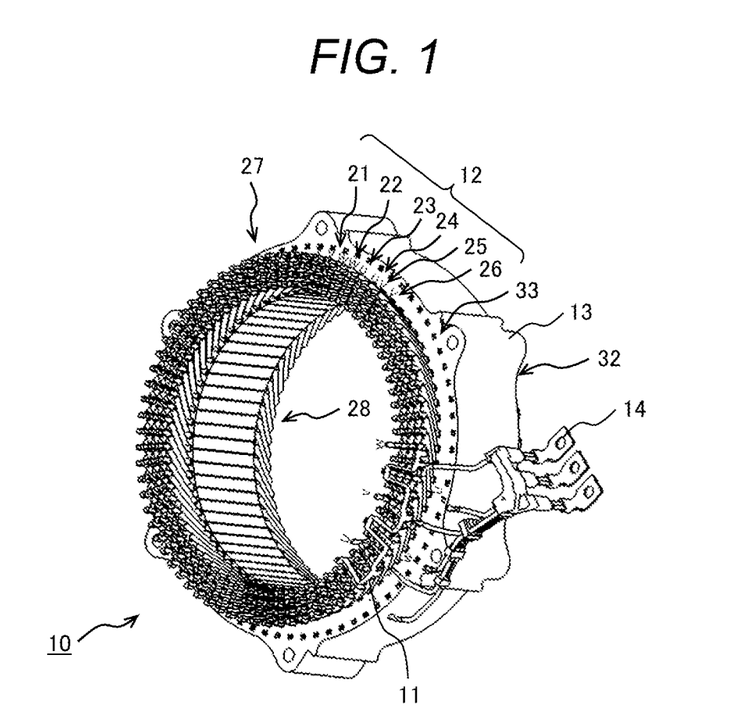
FIG. 1 is a perspective view illustrating an example of a stator of a dynamo-electric machine of an example.
Figure 2:
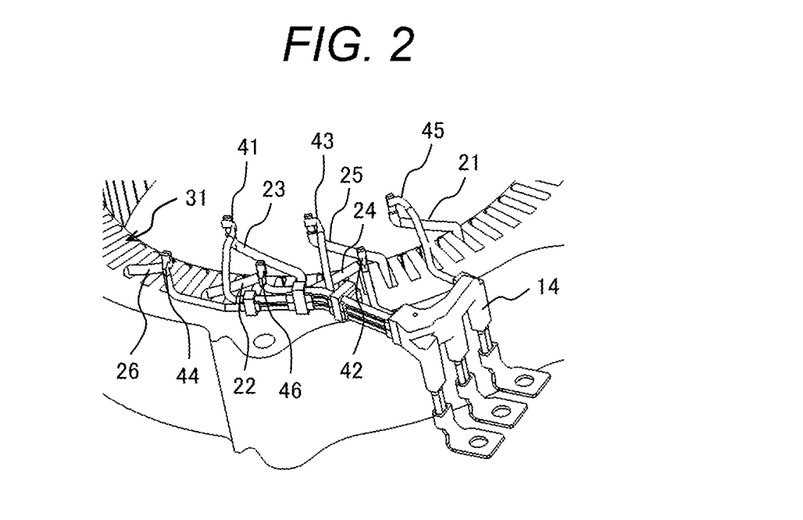
FIG. 2 is a diagram enlarging a stator core 13 and a power distribution member 14 of FIG. 1.

FIG. 1 is a perspective view illustrating an example of the stator of the dynamo-electric machine of the present example, and FIG. 2 is a diagram enlarging a stator core 13 and a power distribution member 14 of FIG. 1. FIG. 1 illustrates a so-called open side as a side on which the end portions of windings 12 are present. The dynamo-electric machine in which a stator of the dynamo-electric machine of the present example (hereinafter, simply referred to as a "stator") 10 is used is a motor generator that functions as an electric motor when the vehicle is driven and functions as an electric generator when the vehicle is braked, and is a three-phase dynamo-electric machine. The dynamo-electric machine mainly includes the stator 10 illustrated in FIG. 1, and a rotor (not illustrated) disposed at a predetermined spacing on the inner peripheral side of the stator 10.

As illustrated in FIG. 1, the stator 10 includes the stator core 13, the each-phase windings 12 wound around the stator core 13, a neutral wire 11, and the power distribution member 14.

[The Configuration of the Stator Core]

The stator core 13 is provided with plural (for example, 72) slots 31. The each-phase winding 12 is disposed in each of the plural slots 31. The slot 31 is configured as, for example, an open slot. That is, in the peripheral direction, the width of the slot 31 is substantially constant along the radial direction. Thus, the slot 31 is configured such that the each-phase winding 12 is insertable from the center side of the stator core 13.

[The Configuration of the Each-Phase Winding]

The each-phase windings 12 are configured of plural conductor coils with insulating films, and flat wires with insulating films are used as the conductor coils. The each-phase windings 12 may have other configuration as long as they are wound around the stator core 13 and each have one end drawn out for the power distribution component. For example, the each-phase winding 12 may have a winding cross-sectional shape that is not only square, but also is rhombic, trapezoidal, or circular.

As the conductor coil with insulating film configuring the each-phase winding 12, the flat wire having a square shaped cross section is used. As the element wire, a copper wire, a copper-tin alloy wire, a silver plated copper wire, and the like can be used. As the insulating film, an enamel film of polyimide (polyamide imide, PEEK, polyurethane, polyester, or polyester imide is also available) is used.

The each-phase windings 12 are three-phase windings wound around the stator core 13 by a distribution winding method. The each-phase windings including U-phase windings 23, 24, V-phase windings 25, 26, and W-phase windings 21, 22 are wound around the stator 10 of the three-phase dynamo-electric machine. In addition, in the conductor coils configuring the windings, the plural conductor coils are inserted across two slots 31 spaced by a predetermined number of slot spaces from one axial direction end portion 32 of the stator core 13, the tip portions of the conductors projected to the other axial direction end portion 33 of the stator core 13 are sequentially joined according to a coil twisting method to be wound around along the peripheral direction, and this is repeated so that the each-phase windings 12 are wound at a predetermined number of windings.

The conductor coil is made by molding one conductor with insulating film in U-shape or V-shape. In the conductor coil, two leg portions are inserted into two slots 31 spaced by a predetermined number of slot spaces from the one axial direction end portion 32 of the stator core 13 toward the other axial direction end portion 33 of the stator core 13 in such a manner that the folding portions thereof come to the one axial direction end portion 32 of the stator core 13. The two leg portions projected to the other axial direction end portion 33 side are folded by a twisting jig, and are welded to the leg portions (separation portions in which the insulating films are separated) of the adjacent conductor coils. The same-phase windings are welded, and this is repeated. The neutral wire 11 forming a neutral point, the U-phase windings 23, 24, the V-phase windings 25, 26, and the W-phase windings 21, 22 are welded.

In FIG. 2, the power distribution member 14 to be connected with a dynamo-electric machine drive circuit, such as an inverter, is made such that plural circular wires (flat wires are also available) with insulating films are molded in predetermined shape, and are then integrated by a resin mold. The power distribution member 14 has insulating film separation portions 41, 42, 43, 44, 45, 46 in which the insulating films are separated. The insulating film separation portions 41, 42 are welded and connected with the U-phase windings 23, 24, the insulating film separation portions 43, 44 are welded and connected with the V-phase windings 25, 26, and the insulating film separation portions 45, 46 are welded and connected with the W-phase windings 27, 28.

Figure 3:
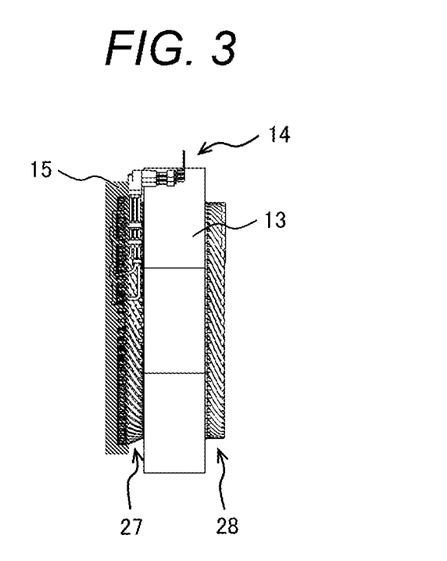
FIG. 3 is a side view of the stator core 13 of FIG. 1.

FIG. 3 is a side view of the stator core 13 of FIG. 1. In FIG. 3, a coil end 27 including the leg portions (the separation portions in which the insulating films are separated) of the conductor coils at the end portion of the stator, the neutral wire 11 (not illustrated), and the insulating film separation portions 41, 42, 43, 44, 45, 46 in which the insulating films are separated of the power distribution member 14 are coated by insulating films 15 formed by powder coating using the powder coating material of the insulating resins. In the present example, for example, epoxy resin particles are coated onto the surfaces of the coil end 27, the neutral wire 11 (not illustrated), and the insulating film separation portions 41, 42, 43, 44, 45, 46 in which the insulating films are separated of the power distribution member 14 are heated and melted, and insulation coat and integrate them. In this way, the particles can be easily fluidized by being heated and melted, and are thus penetrated into the narrow gaps well, so that the coil end 27 including the leg portions (the separation portions in which the insulating films are separated) of the conductor coils in which all the insulating film separation portions 41, 42, 43, 44, 45, 46 can be completely coated by the insulating resins even when they are in complicated shape, the neutral wire 11, and the insulating film separation portions 41, 42, 43, 44, 45, 46 in which the insulating films are separated of the power distribution member 14 are coated by the insulating resins in one step of the powder coating.

Figure 4:
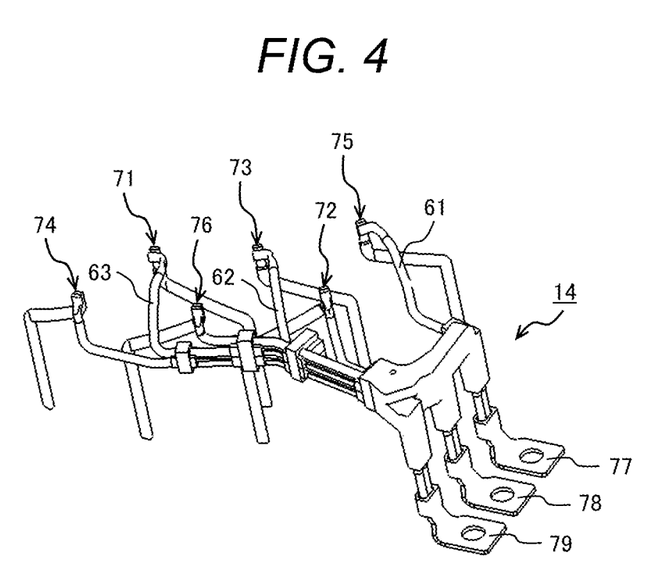
FIG. 4 is an enlarged view of the power distribution member 14 of FIG. 1.

FIG. 4 is an enlarged view of the power distribution member 14 of FIG. 1. In FIG. 4, a welding portion (welding connection point) 71 of the insulating film separation portion 41 in which the insulating film of the power distribution member 14 is separated and the U-phase winding 23, a welding connection point 73 of the power distribution member separation portion 43 and the V-phase winding 25, and a welding connection point 75 of the power distribution member separation portion 45 and the W-phase winding 21 are apart from fastening portions 77, 78, 79 of the power distribution member 14 and the dynamo-electric machine drive circuit with respect to a welding connection point 72 of the power distribution member separation portion 42 of and the U-phase winding 24, a welding connection point 74 of the power distribution member separation portion 44 and the V-phase winding 26, and a welding connection point 76 of the power distribution member separation portion 46 and the W-phase winding 22. Consequently, due to the out-of-phase vibration from the dynamo-electric machine drive circuit and the U-phase, V-phase, and W-phase windings, the welding connection points 71, 73, 75 cause higher stress concentration than the welding connection points 72, 74, 76, so that the fear of cracking the welding portions is high.

Figure 5:
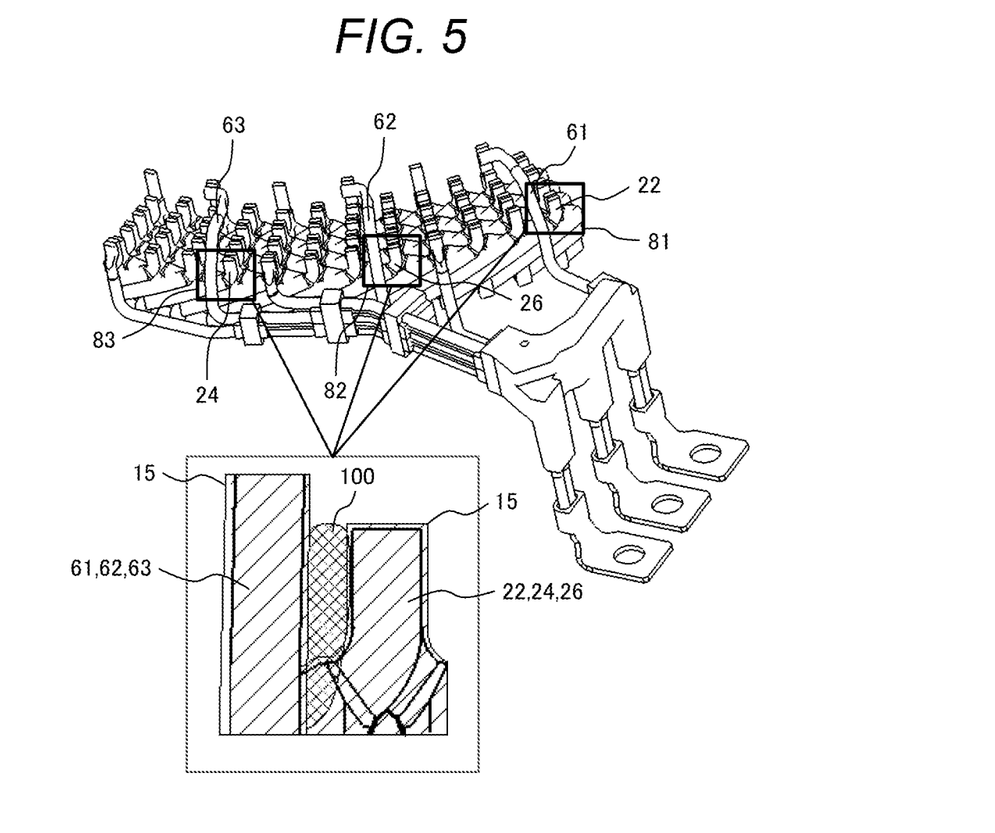
FIG. 5 is an enlarged view of the power distribution member 14 and each-phase windings of FIG. 1.

FIG. 5 is an enlarged view of the power distribution member 14 and the each-phase windings of FIG. 1. In the square frame of FIG. 5, illustrated is a top view enlarging fixing portions of power distribution member coils 61, 62, 63 and the each-phase windings 22, 24, 26, which are portions particularly requiring fixing in order to prevent breakage due to the vibration of the windings and the coils of the power distribution member. In the present example, the insulating films 15 coating the entire separation portions form the insulating films, and at the same time, have a function of reinforcing the strength of the welding portions. In particular, fixing portions 81, 82, 83 of the power distribution member coils 61, 62, 63 and the each-phase windings 22, 26, 24 are reinforced by the insulating resins, so that the stresses due to the vibration caused in the welding portions can be prevented.

However, it is difficult for the insulating films 15 forming the entire separation portions by the powder coating to stably obtain the fixing portions 81, 82, 83 due to the variation in manufacture (environment, dimension, the state of the resin particles, and the like). In particular, the influence of the variation in the gap width of the power distribution member coils 61, 62, 63 and the each-phase windings 22, 26, 24 is larger than the variation in manufacture.

To eliminate the above variation of the fixing portions 81, 82, 83, the following two types of methods are considered. In a first method, the powder coating is thickly applied in consideration of the maximum value of the variation in gap. An advantage of this method is that the powder coating is completed in one step. A disadvantage of this method is that the insulating film is thickly coated to deteriorate the heat dissipation properties of the stator 10. The insulating resin has a low coefficient of the heat dissipation properties, and as it is thicker, the heat dissipation properties of the stator 10 are more deteriorated. In a second method, the powder coating is applied at a minimum thickness satisfying the insulation properties, and in addition, an adhesive material having a high fluidity at the time of the coating is disposed and fixed to the fixing portion. In the present example, the power distribution member coils 61, 62, 63 and the each-phase windings 22, 26, 24 are fixed at the fixing portions 81, 82, 83 by a thixotropic adhesive 100 having high thixotropic properties. The advantage of this method is that since the thickness of the powder coated insulating film is reduced at the minimum, it is possible to achieve the maintaining of the heat dissipation properties of the stator 10 and the stable obtaining of the fixing portions 81, 82, 83. In the present example, this method is adopted.

In FIG. 5, the highly thixotropic adhesive 100 is provided to the fixing portions 81, 82, 83. The highly thixotropic adhesive is an adhesive having a low viscosity at the time of coating and a high viscosity at the time of fixing. Therefore, the highly thixotropic adhesive 100 flows into the gaps of the fixing portions 81, 82, 83 at the low viscosity at the time of the coating, and can be precisely disposed at the predetermined bonding and fixing locations at the time of the completion of the coating. The highly thixotropic adhesive 100 is cured at a predetermined constant temperature and for the x time after the completion of the coating, and fixes and connects the power distribution member coils 61, 62, 63 and the each-phase windings 22, 26, 24 with each other.

As described above, by fixing the power distribution member coils 61, 62, 63 and the each-phase windings 22, 26, 24 by the fixing portions 81, 82, 83 separately from the insulating films 15, the power distribution member coils 61, 62, 63 and the each-phase windings 22, 26, 24 can be reliably fixed by the required minimum configuration without increasing the thickness of the insulating films 15. In addition, by using the material having the high fluidity for the fixing portion at the time of the coating, it can be reliably coated also into the gap of the portion having the complicated shape due to the twisting of the windings, as illustrated in FIG. 5.

Further, since the fixing portions 81, 82, 83 are provided aside from the insulating film 15, the fixing portions 81, 82, 83 can be added also to the existing stator core.

Figure 6:
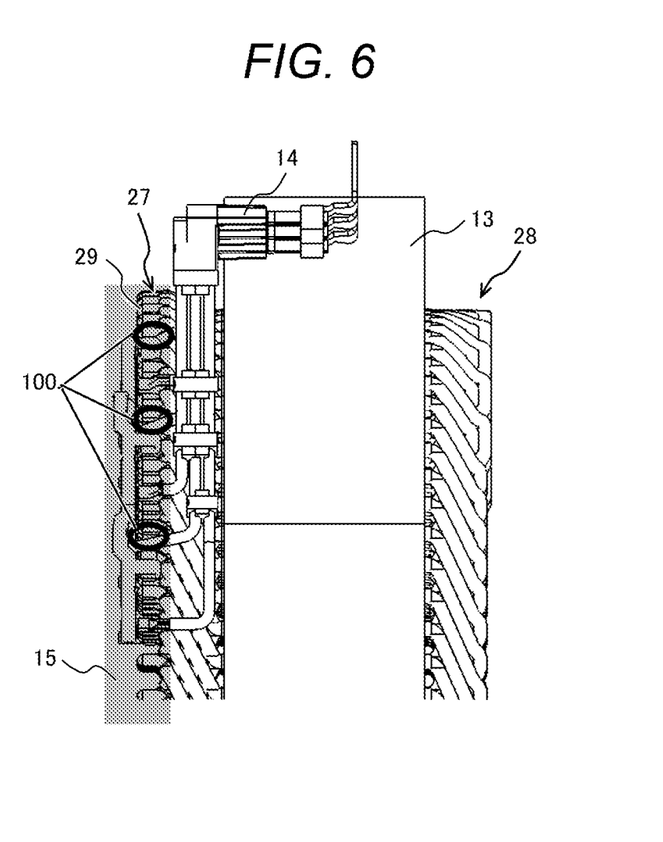
FIG. 6 is a perspective view illustrating an example of the stator of the dynamo-electric machine of the example.

FIG. 6 is a side view illustrating an example of the stator of the dynamo-electric machine of the example. The left side of the sheet illustrates the open side illustrated in FIG. 1, and the right side of the sheet illustrates a close side opposite the open side that is a side on which the windings are folded back. On the open side, the insulating film of the coil is separated for the welding, so that the power coating is necessary in order to prevent the exposing of the coil. On the other hand, on the close side, the powder coating and the adhesive 100 are not provided, or the powder coating and the adhesive 100 are provided in smaller amounts than the open side. In the winding 12 on the close side, the insulating film is not separated, and from the viewpoint of, for example, the heat dissipation properties, it is preferable not to use the powder coating and the adhesive 100.

Second Example

Figure 7:
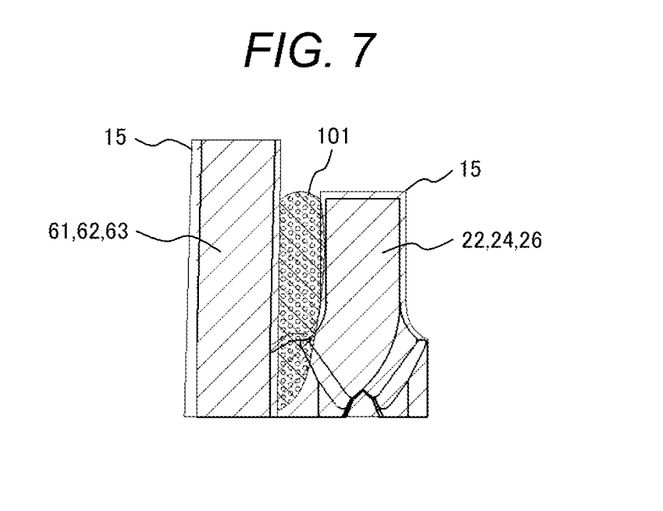
FIG. 7 is a top view enlarging a fixing portion of each of power distribution member coils 61, 62, 63 and each-phase windings 22, 24, 26 of a second example.

FIG. 7 is a top view enlarging the fixing portions of the power distribution member coils 61, 62, 63 and the each-phase windings 22, 24, 26 of a second example. The present example illustrates an example in which a foaming adhesive 101 is used for the fixing portion. The foaming adhesive 101 is a material that is a liquid having viscosity at room temperature, foams the foaming agent contained in the adhesive when it exceeds the certain temperature, and causes a curing reaction when heat is further applied, thereby bonding a target object. In particular, the foaming of the material at the time of the curing increases the volume of the adhesive itself, thereby enabling the narrow portion to be filled. After having been coated into the bonding portion, the foaming adhesive 101 is foamed at a predetermined temperature and for a predetermined time, and is cured at a predetermined temperature and for a predetermined time, so that the power distribution member coils 61, 62, 63 and the each-phase windings 22, 26, 24 can be fixed with no gaps.

Third Example

Figure 8:
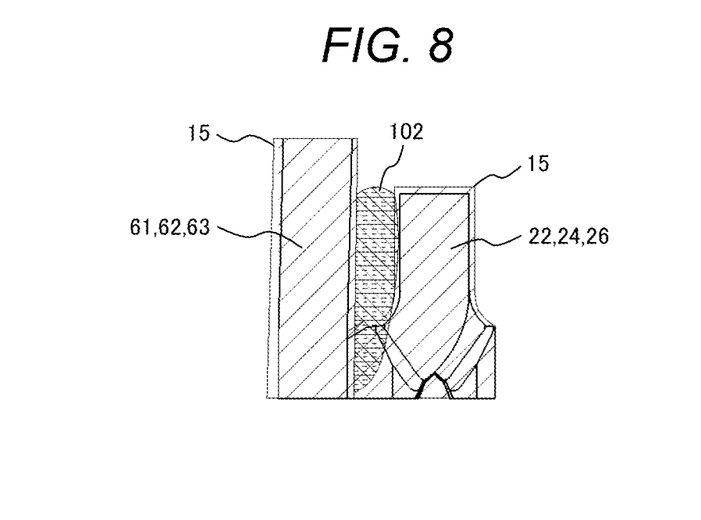
FIG. 8 is a top view enlarging the fixing portion of each of the power distribution member coils 61, 62, 63 and the each-phase windings 22, 24, 26 of a third example.

FIG. 8 is a top view enlarging the fixing portions of the power distribution member coils 61, 62, 63 and the each-phase windings 22, 24, 26 of a third example. The present example illustrates an example in which a UV curable adhesive 102 is used for the fixing portion. The UV curable adhesive is a material that is a liquid having viscosity at room temperature, causes a gelling reaction when irradiated with a UV light, and is cured when heat is then applied, thereby bonding a target object. In particular, since the UV curable adhesive 102 can be gelled by the UV light irradiation, not by the heating, after the coating of the adhesive, it is possible to prevent the changing of the shape of the bonding portion due to lowered viscosity when heat is applied for the curing. After having been coated onto the bonding portion, the UV curable adhesive 102 is gelled at a predetermined UV irradiation amount, and is cured at a predetermined temperature and for a predetermined time, so that the power distribution member coils 61, 62, 63 and the each-phase windings 22, 26, 24 can be fixed.

Fourth Example

Figure 9:
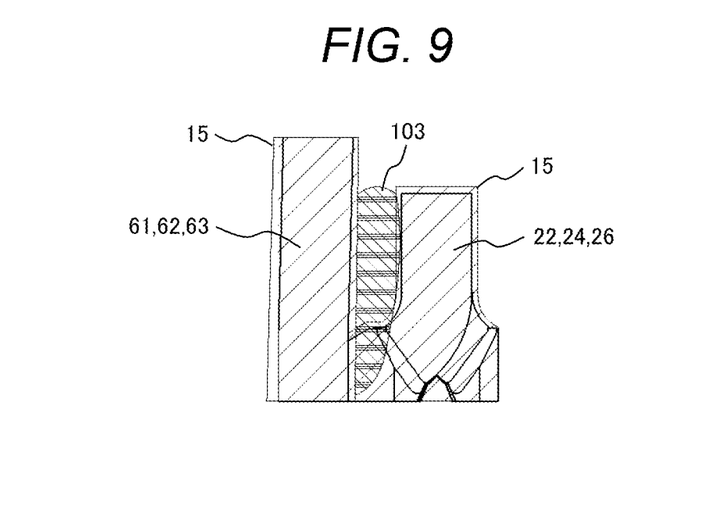
FIG. 9 is a top view enlarging the fixing portion of each of the power distribution member coils 61, 62, 63 and the each-phase windings 22, 24, 26 of a fourth example.

FIG. 9 is a top view enlarging the fixing portions of the power distribution member coils 61, 62, 63 and the each-phase windings 22, 24, 26 of a fourth example. The present example illustrates an example in which a sheet adhesive 103 is used for the fixing portion. The sheet adhesive is a material that is a solid at room temperature, is fluidized when it exceeds the certain temperature, and causes a curing reaction when heat is further applied, thereby bonding a target object. In particular, since the sheet adhesive 103 is in a solid state at room temperature, it is easily disposed at the portion to be bonded. In addition, since the sheet adhesive 103 is sheet-like, the adjustment of the shape is enabled according to the shape of the fixing portion. After having been disposed at the bonding portion, the sheet adhesive 103 is melted at a predetermined temperature and for a predetermined time to increase the bonding area, and is cured at a predetermined temperature and for a predetermined time, so that the power distribution member coils 61, 62, 63 and the each-phase windings 22, 26, 24 can be fixed.

According to the present invention, the power distribution member coils 61, 62, 63 can be clearly fixed without affecting the coating thickness of the entire end portion, and the strength of the welding connection points 71, 73, 75 can be secured. Thus, the power distribution member coils 61, 62, 63 can be fixed with a small amount of material, so that the product weight and cost can be reduced. In addition, since the power distribution member coils 61, 62, 63 can be fixed without increasing the coating film thickness of the entire coil end, the heat dissipation properties of the motor can be secured.

In the adhesive material used for the fixing portion, the fixing portion is fixed by the material having bonding properties different from the insulating film, so that the appearance quality of the fixing portion is easily visually inspected, and after the adhesive material is coated onto the fixing portion, the correction of its shape and the removal of the adhesive material are enabled.

It should be noted that the present invention is not limited to the examples described above, and includes various modification examples. For example, the examples described above have been described in detail to simply describe the present invention, and are not necessarily required to include all the described configurations. In addition, part of the configuration of one example can be replaced with the configurations of other examples, and in addition, the configuration of the one example can also be added with the configurations of other examples. In addition, part of the configuration of each of the examples can be subjected to addition, deletion, and replacement with respect to other configurations.

REFERENCE SIGNS LIST

10: stator of dynamo-electric machine
11: neutral wire
12: each-phase winding
13: stator core
14: power distribution member
15: insulating film coating entire separation portion
21, 22: W-phase winding
23, 24: U-phase winding
25, 26: V-phase winding
27: open side coil end
28: close side coil end
29: welding portion of coil leg
31: slot
32, 33: axial direction end face
41, 42, 43, 44, 45, 46: power distribution member separation portion
61, 62, 63: power distribution member coil
71, 72, 73, 74, 75, 76: welding portion of power distribution member and each-phase winding
77, 78, 79: fastening side of power distribution member and dynamo-electric machine drive circuit
81, 82, 83: bonding and fixing portion

What is claimed is:

1. A stator of a dynamo-electric machine comprising:
   a stator core;
   a winding wound around the stator core;
   a power distribution member having a coil in which one end is connected to the winding and the other end is connected to a power supply device; and
   an insulating film coating at least one end portion of the winding, wherein
   the stator has a fixing portion fixing the winding and the coil of the power distribution member,
   the fixing portion is fixed by an adhesive material provided separately from the insulating film, and
   the adhesive material has thixotropic properties.

2. The stator of the dynamo-electric machine according to claim 1, wherein the fixing portion is fixed by an adhesive material provided separately from the insulating film.

3. The stator of the dynamo-electric machine according to claim 2, wherein the adhesive material is a material that has a fluidity at the time of coating to the fixing portion and is cured to be fixed to the fixing portion.

4. The stator of the dynamo-electric machine according to claim 2, wherein the fixing portion is provided on an open side on which the winding of the stator is not folded back.

5. The stator of the dynamo-electric machine according to claim 1, wherein the fixing portion is fixed by a foaming adhesive.

6. The stator of the dynamo-electric machine according to claim 1, wherein the fixing portion is fixed by a UV curable adhesive.

* * * * *